United States Patent [19]
Kronberg

[11] Patent Number: 5,463,377
[45] Date of Patent: Oct. 31, 1995

[54] APPARATUS FOR DETECTING THE PRESENCE OF A LIQUID

[75] Inventor: James W. Kronberg, Aiken, S.C.

[73] Assignee: The United States of America as represented by the United States Department of Energy, Washington, D.C.

[21] Appl. No.: 133,299

[22] Filed: Oct. 8, 1993

[51] Int. Cl.⁶ .................................................. G08B 21/00
[52] U.S. Cl. ......................... 340/605; 340/604; 340/592
[58] Field of Search .................................... 340/605, 573, 340/592, 593, 603, 604, 384.1

[56] References Cited

U.S. PATENT DOCUMENTS

| | | | |
|---|---|---|---|
| 4,246,575 | 1/1981 | Purtell et al. | 340/605 |
| 4,502,044 | 2/1985 | Farris et al. | 340/604 |
| 4,598,273 | 7/1986 | Bryan, Jr. et al. | 340/539 |
| 4,653,491 | 3/1987 | Okada et al. | 128/138 |
| 4,754,264 | 6/1988 | Okada et al. | 340/573 |
| 5,293,149 | 3/1994 | Wilson et al. | 340/384.73 |

OTHER PUBLICATIONS

*Hands–On Electronics*, Sep./Oct. 1986, p. 24, FIG. 36–5.

*Primary Examiner*—John K. Peng
*Assistant Examiner*—Ashok Mannaua
*Attorney, Agent, or Firm*—Brian R. Tumm; Harold M. Dixon; William R. Moser

[57] ABSTRACT

An apparatus for detecting the presence of a liquid in a region, including an electrically passive sensor adapted for contacting the liquid, and an electrically active detector. The sensor is a circuit with a pair of spaced-apart terminals connected to a switch that closes in the presence of the liquid. The detector carries an alternating current with a resonant frequency. When the sensor is placed in a region and liquid is present in the region, the circuit of the sensor is closed. By bringing the detector close to the sensor, an alternating current is induced in the sensor that will, in turn, alter the resonant frequency of the detector. The change in the resonant frequency is signaled by a transducer. The switch can operate by a change in conductivity of a material between the terminals of the sensor or by expansion of a liquid absorber that pushes the two terminals together, or by a change in the conductivity of the space between the terminals as a result of the presence of the liquid. The detector generates an audible or visible signal, or both, in response to the change in current.

18 Claims, 3 Drawing Sheets

APPARATUS FOR DETECTING THE PRESENCE OF A LIQUID

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to an apparatus for detecting the presence of a liquid. In particular, the present invention relates to an apparatus having an electrically passive sensor adapted for placement in a region where the presence of a liquid is to be detected, and an electrically active detector that draws information from the sensor through mutual inductance or conductivity when activated by the user.

2. Discussion of Background

Liquid-presence and liquid-level detection are important in a wide variety of situations, both in the industrial process environment and elsewhere. Many industrial liquids are hazardous to individuals and to the environment. In such situations, prompt detection and repair of leaks is imperative. Leaks in concealed or buried structures—including structures such as wall, floor and ceiling-mounted piping, underground pipelines and storage tanks, between liners of landfills, outside swimming pool liners, dams, roofs, foundation walls, attic-mounted or roof-mounted heating and air conditioning systems— may go undetected for extended periods of time. The longer a leak is undetected, the more likely it is to cause structural or environmental damage, and the more expensive it is to repair.

A common approach to leak and spill prevention is the use of secondary containment systems, where a second barrier surrounds the main liquid container. On a laboratory scale, this may be as simple as carrying or storing a reagent bottle in a bucket. If the bottle is cracked, or if its cap is not tightly sealed and the contents leak, the liquid is held inside the bucket where— at least in principle—it will do no damage and will be promptly noticed and dealt with. Many storage tanks and process pipelines have double walls so that, if the inner wall leaks, the outer wall contains the liquid. However, it is often difficult to detect leaks in the inner wall before they cause more extensive structural damage.

Existing liquid-level and liquid-presence detectors respond to the electrical and thermal conductivity, capacitance, density, surface tension, and the chemical, optical and acoustic properties of the liquid of interest. For example, Bryan, Jr., et al. (U.S. Pat. No. 4,598,273) and Farris, et al. (U.S. Pat. No. 4,502,044) show moisture detection systems for roofs. The Bryan, Jr. system comprises a plurality of independent and insular moisture detecting units placed in a predetermined spatial relationship across a surface, such as a roof structure, and beneath an otherwise water-impermeable membrane. Each detecting unit includes moisture detection, power supply, and signaling units. As water penetrates holes in the membrane of the surface, the water activates a battery that supplies power to the signaling unit. Farris, et al. show a grid having at least two conductors with a plurality of spaced-apart extensions. The grid provides an impedance between the conductors that decreases in the presence of moisture. An audible signal generating circuit is coupled to the detector and responds to the resultant decrease in the impedance. Purtell, et al. (U.S. Pat. No. 4,246,575) discloses a moisture-activated switch comprising a compressed dehydrated cellulose sponge wafer having conductive plates attached to opposing faces. When the wafer swells in response to contact with moisture, a bridging conductor electrically connects the two plates.

None of these devices is widely applicable to detecting leaks in secondary containment systems, where the sensing must typically be done in very close quarters, often in the gap between two closely-spaced walls. In addition, an environment of use may be corrosive, and a relatively large amount of liquid, identical with that whose leakage is to be detected, is almost always located close by, just on the other side of the inner or primary containment. Furthermore, any breach in the outer, secondary barrier—for the penetration of wiring or optical fibers—is undesirable since it, too, could act as a path for leakage.

Prompt detection of fluids is also important from the standpoint of comfort and sanitation. For example, infants and many incontinent adults use diapers, which must be changed at intervals. An infant may be aware that a diaper is wet and needs changing, but might not communicate that need effectively. Some adults may sense when a diaper is wet, however, others may find it difficult or impossible to do so. Regardless of whether traditional cloth diapers or leak-resistant disposable diapers are used, there is at present no convenient means—short of opening or removing the diaper—of determining when it needs to be changed. Resealing a previously-sealed disposable diaper is difficult because the waterproof cover may be turn when its sealing tapes are opened, thus, even a dry diaper must usually be discarded after opening. A safe, convenient and inexpensive device for checking diaper wetness in situ, without requiring opening or removal of the diaper, would result in increased comfort for users and prevent the premature disposal of large numbers of diapers.

Conductivity probes are available for detecting the presence of moisture between two spaced-apart electrodes, however, these could cause shock or injury when used with humans. Okada, et al. (U.S. Pat. Nos. 4,754,264 and 4,653, 491) disclose capacitance-detecting devices that sense the degree of wetness of a diaper and transmit the information to a remote location. Both devices use a sensing unit composed of a water impermeable upper sheet, a water permeable lower sheet, and a pair of metal layers placed between the sheets in parallel. One of the metal layers is covered with an electrical insulating layer. The presence of water is detected through the change in electrostatic capacitance between the two metal layers. These devices may be uncomfortable for long-term use, since, like typical conductivity probes, they depend on conductive wires to transmit a signal to a remote sensing unit. In addition, both devices are continuously activated so that the monitor can respond to the presence of a liquid when the diaper is wetted. There is no presently-available, electrically passive device that may be inserted inside a diaper at intervals to check on its state (i.e., wet or dry), or left in situ with no possibility of current flow that might injure the wearer.

There remains a need for an apparatus for sensing the presence of a liquid that would be usable with virtually any liquid regardless of its density, electrical or optical properties, that would be unaffected by ambient conditions such as temperature, and that would sense moisture without the need for physical contact between the detector and the sensor, or between the detector and the region wherein a liquid is to be detected.

SUMMARY OF THE INVENTION

According to its major aspects and broadly sated, the present invention is an apparatus for detecting the presence of a liquid. The apparatus includes an electrically passive sensor that would be positioned for contacting the liquid, and a separate, electrically active detector interacting with the sensor. When the sensor is placed in the region where the liquid is to be detected, the detector is activated by the user to produce a signal that is indicative of the presence (or absence) of the liquid.

The sensor includes a moisture-activated switch that is open in the absence of the liquid and closed in the presence of the liquid. The sensor and detector may be physically isolated from one another and electrically coupled by mutual electrical inductance. When the detector is brought close to the sensor and an alternating current (AC) is applied to the detector, the resulting magnetic field about the detector induces an alternating current in the sensor. The sensor current changes in response to the state of the switch, thereby changing the magnetic field about the detector and therefore the effective inductance and the current through the detector. Alternatively, the detector is directly connected to the sensor so that the detector current changes depending on the state of the switch. A transducer generates an audible or visible signal, or both, in response to the changing detector current.

An important feature of the present invention is the interaction between the sensor and detector portions of the apparatus. In a preferred embodiment, the mutual inductance of neighboring, but physically and electrically isolated circuits is used to detect the presence (or absence) of a liquid. Each circuit preferably includes an electrically conducting, multiturn coil. A current flowing in either of two such coils sets up a magnetic field, a portion of which passes through the other coil. Thus, current flowing in the detector coil sets up a magnetic field which passes through the sensor coil, and current in the sensor coil sets up an opposing magnetic field which in turn passes through the detector coil. Changes in the conductivity of the path between the ends of the sensor coil produce changes in the effective inductance—and therefore the current—in the detector, even though the two coils are physically isolated from one another. Current flows in the sensor only when these conditions are satisfied: the switch is closed, and the detector coil is brought near the sensor and activated by the user. This minimizes power usage and, when used on humans, minimizes the potential for shock or injury. Alternatively, the switch is connected directly to the detector circuit. Again, current flows only when the switch is closed and the detector is activated.

Another feature of the present invention is the sensor, which is adapted to be placed in the region where a liquid is to be detected. The sensor is electrically passive, that is, no current flows in the sensor until the detector is activated. In a preferred embodiment of the invention, the sensor comprises an electrically-conducting coil contained in a durable, substantially water-impermeable housing. The switch is attached to the outer surface of the housing and in electrical communication with the coil. The size, shape and materials of the coil, and the number and spacing of the turns of wire forming the coil depend on the liquid to be detected. The number of turns is such that the resonant frequency of the detector changes between the dry and wetted state of the switch. By way of example, a smaller number of turns is needed for detecting a strongly-ionized and highly reactive liquid such as nitric acid than for detecting liquids of relatively low conductivity such as biological fluids or organic solvents. Coils exposed to highly reactive liquids are preferably made of noble metals such as gold or platinum, while coils used for detecting biological fluids might be made of aluminum or stainless steel. If desired, the sensor coil might consist of a single, continuous multiturn coil, formed on the surface of a flexible, electrically non-conducting substrate by etching or otherwise from an originally continuous metallic sheet.

Still another feature of the present invention is the detector. The detector is electrically active and adapted for placement outside the region where the liquid is to be detected. The detector powers the first portion and draws information from it, either indirectly through the mutual inductance of two electrically conducting coils or directly through the conductivity of the sensor. Preferably, the second portion is contained in a substantially water-impermeable housing that may be grasped by the operator for use.

Another feature of the present invention is the switch, including two spaced-apart conductors that form an open circuit in the absence of the liquid. The conductivity of the path between the conductors increases in the presence of the liquid, closing the circuit and, when the detector is activated, indicating the presence of the liquid. The switch may be electrically or mechanically activated by the liquid. Thus, the switch may take the form of an interdigitated electrode that provides a large contact area with the liquid. Alternatively, the first and second conductors may be separated by an electrically non-conducting, absorbent material having strong wicking properties. When the material is wetted, its conductivity increases to provide a conductive path between the conductors. If desired, a compressed, absorbent material may be positioned so that, when it absorbs the liquid, its expansion causes the first and second conductors to contact one another.

Still another feature of the present invention is the output signal. The detector preferably includes a resonant oscillator circuit having a first frequency of oscillation when the switch is open, and a second frequency when the switch is closed. When activated by the operator, the detector provides a frequency-dependent audible signal or a visible signal, or both, informing the operator of the presence or absence of the liquid.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

In the following description, similar components are referred to by the same reference numeral in order to simplify the understanding of the sequential aspect of the drawings.

According to a preferred embodiment of the present invention, an apparatus for detecting the presence of a liquid includes a first circuit adapted for placement in the region where the liquid of interest is to be detected, and a second circuit adapted for placement outside the region. When the first circuit is placed in the region and the second circuit is activated by the operator, the second circuit interacts with the first and produces a signal that is indicative of the presence (or absence) of the liquid.

The first circuit, or sensor, includes a pair of spaced-apart conductors that form an open circuit in the absence of the liquid. When the liquid enters the space between the conductors, it provides a conductive path between the conductors to close the circuit. In a preferred embodiment of the invention, the sensor is physically isolated from the second circuit, or detector, but electrically coupled to the detector by mutual electrical inductance. Thus, when the detector is brought close to the sensor and an alternating (AC) current is established in the detector, the resulting magnetic field about the detector induces an AC current in the sensor. The sensor current changes in response to the presence of a liquid between the conductors, thereby inducing a change in the magnetic field about the detector and the current in the detector. Alternatively, the detector is connected to the sensor so that changes in the conductivity between the conductors directly change the detector current. A transducer generates an audible or visible signal, or both, in response to the changing current in the detector.

Figure 1:
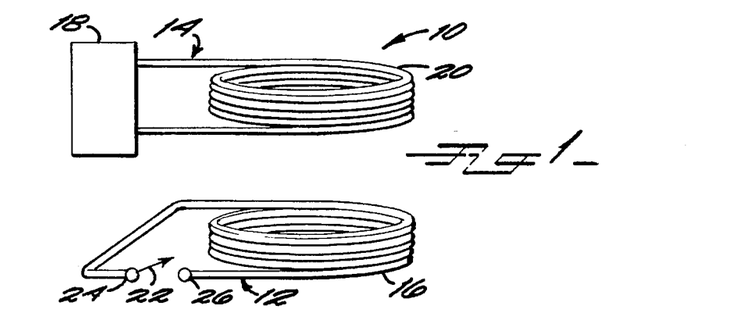
FIG. 1 is a schematic view of an apparatus according to a preferred embodiment of the present invention.

Referring now to FIG. 1, there is shown a schematic view of an apparatus according to a preferred embodiment of the present invention. An apparatus 10 for detecting the presence of a liquid includes an electrically passive sensor circuit 12 adapted to be placed in the region where the presence of a liquid is to be detected, and an electrically active detector circuit 14. Sensor 12 has a first electrically conducting coil 16. Detector 14 includes a monitoring and transmitting circuit 18 connected in series with a second electrically conducting coil 20. In use, coils 16 and 20 are oriented and spaced in such a way that at least a portion of the magnetic field produced by current flowing in either of coils 16, 20 passes through the other coil. Preferably, the plane of coil 20 is approximately parallel to the plane of coil 16 and the axes of coils 16, 20 are roughly coaxial. A switch 22 connects terminals 24, 26 of coil 16.

When switch 22 is open, no current flows in coil 16; the current in coil 20 is limited by the self-inductance of coil 20. When switch 22 is closed, current flows in coil 16 in response to changes in the magnetic field produced by coil 20, and coil 16 generates a magnetic field which partially opposes the field of coil 20. As a result, the effective inductance of coil 20 is lowered and the current through coil 20 increases.

When switch 22 is a moisture-responsive device, detector 14 may be used to detect the presence of liquids in the immediate environment of coil 16. Sensor 12 is placed in the region where a liquid is to be detected, and coil 20 of detector 14 is brought close to coil 16, preferably approximately parallel to and coaxial with coil 16. The presence of the liquid is detected by monitoring the current flow in coil 20, or, preferably, by a resonant oscillator circuit having a frequency and amplitude determined in part by the effective inductance of coil 20, and therefore by conditions at coil 16. If the inductance of coil 20 changes, the resonant frequency will change accordingly. The oscillator output is converted to an audible or visible signal, or both, to indicate the presence (or absence) of the liquid of interest.

Switch 22 may be any suitable mechanical or electrical device that responds, preferably by closing, to the presence of a liquid between ends 24, 26 of coil 16. Switch 22 may utilize the electrical conductivity of the liquid whose presence is to be detected, particularly if the liquid contains a high concentration of mobile ions such as $Na^+$ and $Cl^-$. If the conductivity of the region between terminals 24, 26 changes, the frequency and amplitude of oscillation of circuit 18 change accordingly, indicating that conductive liquid has entered the region where switch 22 is located. However, a liquid that does not actually contact terminals 24, 26 has no effect: ions, being much heavier and thus much less mobile than electrons, show relatively poor conductivity and therefore will exhibit little or no conductivity around a full loop of coil 16. When allowed to bridge a small gap, however, their contribution is much larger. If the gap is between the ends of a multiturn coil, the effect is larger still, because the impedance of the coil changes by a factor of $N^2$ where N is the number of turns of the coil. Therefore, even a small amount of low-conductivity liquid in contact with terminals 24, 26 can be detected reliably, even in the presence of much larger amounts of the same liquid nearby but physically separated from terminals 24 and 26.

Figure 2A:
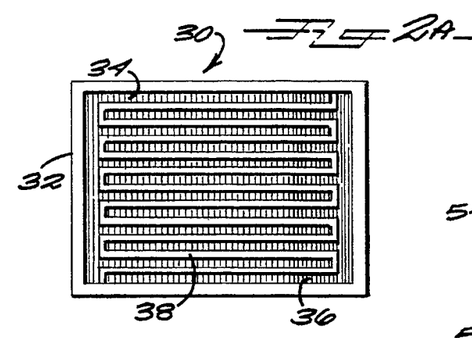
FIG. 2a is an interdigitated electrode usable with the apparatus of FIG. 1.
Figure 2B:
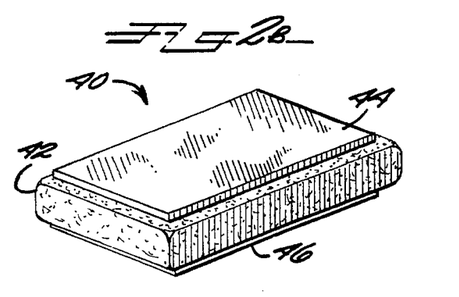
FIG. 2b is a moisture-responsive switch usable with the apparatus of FIG. 1.

Switch 22 may be an interdigitated electrode array 30 having a large contact area between two electrodes (FIG. 2a). Array 30 is formed on an insulating substrate 32 by etching or other suitable means, forming a first conductor 34 and a second conductor 36 separated by a narrow, labyrinthine nonconductive region 38. Alternatively, a switch 40 (FIG. 2b) includes a substantially non-conducting, absorbent material 42 with strong wicking properties held between two planar conductors 44, 46. Material 42 extends outward at the edges of conductors 44, 46 so as to contact the region of interest and draw liquid into itself. The moisture content of material 42 (as reflected by the content of mobile ions) provides a conductive path between conductors 44 and 46.

Figure 2C:
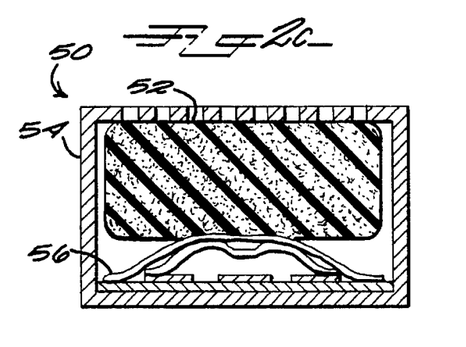
FIG. 2c is a moisture-responsive switch usable with the apparatus of FIG. 1, shown in an open position.
Figure 2D:
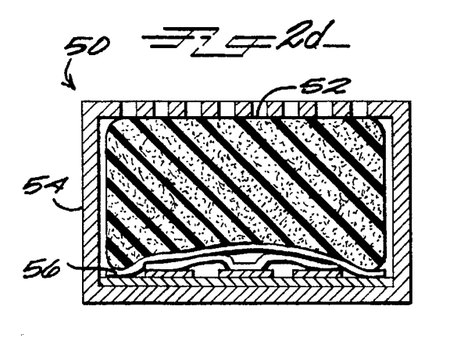
FIG. 2d shows the switch of FIG. 2c in a closed position.

Switch 22 may be a mechanical switch such as that disclosed by Purtell, et al. in U.S. Pat. No. 4,246,575. Purtell, et al. shows a compressed dehydrated cellulose sponge wafer having conductive plates attached to opposing faces. A bridging conductor electrically connects the two plates together upon swelling of the wafer responsive to its contact with moisture. If desired, switch 22 may be the type of mechanical switch shown in FIGS. 2c and 2d. A switch 50 includes a pad made of water-absorbent material 52 in a rigid, porous housing 54. Pad 52 is positioned adjacent to a waterproof switch 56, preferably a snap-disk switch. When dry, pad 52 is relatively thin and switch 56 is open (FIG. 2c). As pad 52 absorbs moisture, it expands, exerting pressure on switch 56 to close the switch (FIG. 2*d*). Pad 52 is any type of water-absorbent material that expands when wetted, such as compressed cellulose sponge material.

Figures 3, 4, 5:
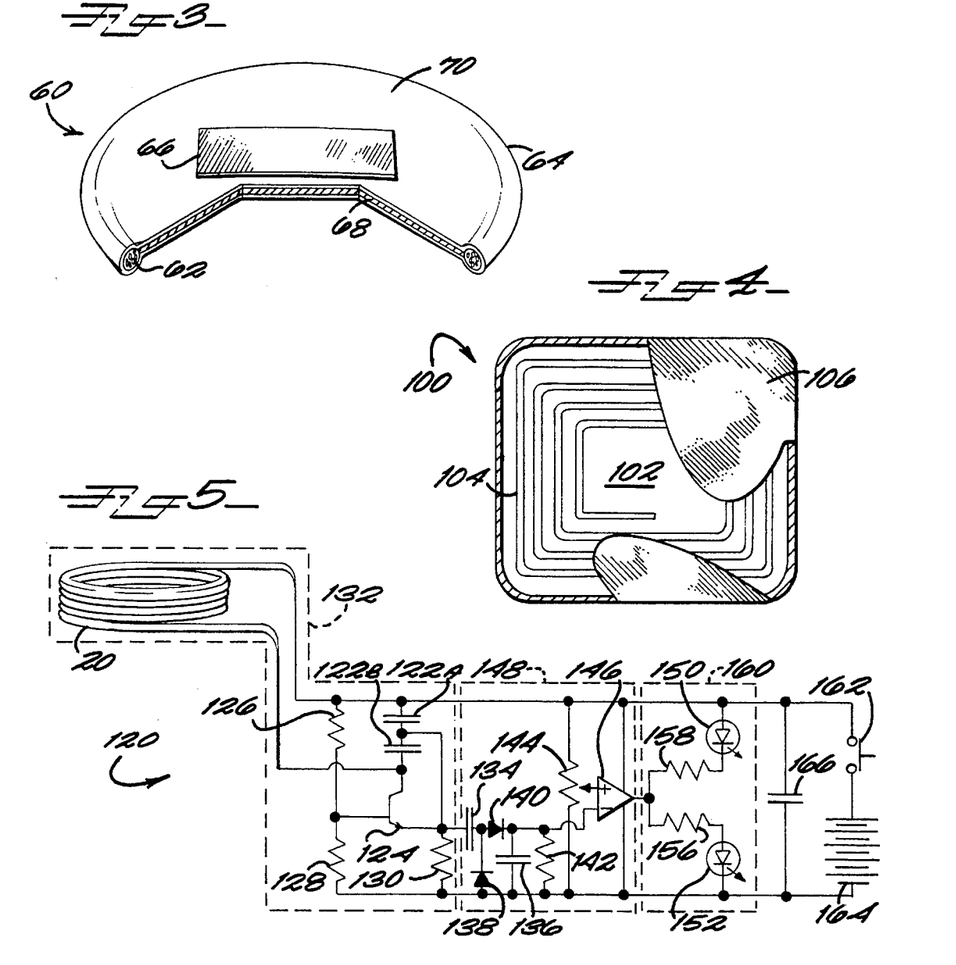
FIG. 3 is a perspective, cut-away view of a sensor according to a preferred embodiment of the present invention.
FIG. 4 shows a sensor according to an alternative preferred embodiment of the invention.
FIG. 5 shows a detecting and monitoring circuit for use with the apparatus of FIG. 1.

As noted above, sensor 12 and detector 14 include conductors that have a mutual inductance such that circuit 18 provides an output signal indicative of the presence (or absence) of the liquid from the vicinity of sensor 12, preferably electrically conducting coils such as coils 16, 20. Referring now to FIG. 3, there is shown a liquid sensor that is suitable for use with the present invention. A sensor 60 as shown in FIG. 3 is a sealed, electrically passive unit designed to be placed in any location where it is desired to detect the presence of a liquid, such as near industrial process piping, near an underground storage tank, in an attic or basement, between the walls of a double-walled containment system, inside a diaper, and so forth. Sensor 60 includes an electrically conducting coil 62, a protective coating or housing 64 and an electrode array 66. Sensor 60 may also include a stiffening disk 68.

Coil 62 is made up of a number of turns of fine insulated wire such as enameled magnet wire. Coil 62 preferably has between 5 and 100 turns. All turns of coil 62 follow approximately the same path, which may be approximately circular as shown in FIG. 3, elliptical, or polygonal to form a generally toroidal ring. Disk 68, if present, is preferably made from substantially rigid, electrically nonconductive plastic or ceramic material such as phenolic circuit board, with a diameter approximately equal to the inside diameter of coil 62. Disk 68 is mounted within coil 62, preferably just engaging the coil along the inner circumference thereof. Alternatively, disk 68 may be a narrow-rimmed bobbin with coil 62 wound directly thereon.

Housing 64 is made of a tough, substantially water-impermeable material such as epoxy, leaving short lengths of the two ends of coil 62 exposed on an outer surface 70 of the housing. Electrode array 66, similar to interdigitated electrode array 30 shown in FIG. 2*a*, is connected to the exposed ends of coil 62, one electrode to each end, and positioned so that array 66 substantially engages outer surface 70. Alternatively, a suitable electrode array may be formed by patterns of conductive ink, paint or similar material applied directly to surface 70. If desired, some other type of moisture-responsive device, such as switch 40 (FIG. 2*b*) or switch 52 (FIG. 2*c*), may be used.

Surface 70 of sensor 60 is formed so as to make good contact with the liquid to be detected. Thus, for use on generally flat surfaces, surface 70 may be approximately flat. For use with process piping, surface 70 may be slightly concave so as to make good contact with the curved outer wall of the piping. For use in a diaper, sensor 60 is worn within the diaper between the waistband and the pubic region, with electrode array 66 preferably facing away from the body and contacting the diaper material. If desired, the diaper may be provided with a pocket for placement of sensor 60. Here, surface 70 may be flat or slightly convex so as to make good contact with dry or damp cloth.

Sensor 60 is shaped and sized appropriately for the intended use. The number of turns of wire forming conducting coil 62 and the outer diameter of the coil are such that, when coil 62 is coupled with coil 20 of detector 14 (FIG. 1), the resonant frequency of circuit 18 and coil 20 changes between the dry and wetted states of sensor 60. Coil 62 may, for example, have an outer diameter between approximately 1"–4" (about 2.5–10 cm) and a slightly smaller inner diameter.

The materials used for sensor 60, the number and spacing of the turns forming coil 62, and the overall configuration of coil 62 depend on the liquid to be detected. For detecting a strongly-ionized and highly reactive liquid such as nitric acid, sensor 60 might be made of ceramic or highly inert plastic such as polyvinylidene difluoride (PVDF), polyvinyl chloride (PVC), polyethylene, and so forth, with a small number of coil turns (5–10 turns) formed from a noble metal such as gold or platinum. For liquids that do not contain chloride ions, coil 62 might be made of stainless steel. For an aqueous solution such as biological waste, coil 62 has a larger number of turns (10–30), formed of any suitable electrically-conducting wire such as stainless steel. For a liquid of very low conductivity such as an organic solvent, a very large number of turns (30–100 or more) is desirable so that, in the presence of the liquid of interest, the increased capacitance between the electrodes of array 66 provides sufficient frequency lowering without any need for contributions from mobile ions.

An alternative preferred embodiment of a liquid sensor according to the present invention is shown in FIG. 4. A sensor 100 includes a flexible, electrically non-conducting substrate 102 carrying a single, continuous multiturn coil 104. Sensor 100 integrates the functions of coil 62 and switch 66 of sensor 60: when coil 104 contacts the liquid, the interaction between the turns of coil 104 provides sufficient conductivity to change the resonant frequency of the detector coil. The size, number and spacing of the turns of coil 104 are such that, when coil 104 is coupled with coil 20 of detector 14, a readily detectable change in the resonant frequency of the oscillator circuit formed by circuit 18 and coil 20 occurs between the dry and wetted states of sensor 100.

Coil 104 may be formed by fastening electrically conducting wire to the surface of substrate 102, or by etching or otherwise from an originally continuous, metallic sheet. Suitable techniques for forming such a coil are known in the art of printed-circuit manufacture.

The materials of sensor 100 depend on the liquid to be detected. Substrate 102 and coil 104 are preferably made from materials that are substantially inert in the environment of use, that is, materials that will not be attacked by the liquid of interest. For example, a sensor 100 designed to detect leakage of a highly-ionized, corrosive liquid such as nitric acid may consist of stainless steel, gold or platinum film bonded to a substrate of PVDF, then etched to form a coil 104 having 5–10 turns. A sensor for detecting biological fluids may have 10–30 turns etched on copper-clad flexible circuit board material, such as polyimide flexible printed circuit board material. A sensor for a liquid having very low ionization, such as benzene or a chlorinated hydrocarbon, may be made of the same materials but with more turns, such as between 30–100 very closely-spaced turns.

If desired, sensor 100 may be covered with a layer 106 of an absorbent material having strong wicking properties (i.e., strongly wetted but not dissolved by) the liquid to be detected. The material of layer 106 may, for example, take the form of a loose fiber mat. A strongly hydroxylated fiber such as cellulose in the form of a loose mat is preferred for most aqueous or water-miscible liquids. For nonpolar liquids such as benzene and halogenated hydrocarbons, a nonpolar fiber such as spun-bonded polyethylene is preferred.

Some liquids may change the capacitance between the individual turns of coil 104, thereby affecting the response of sensor 100 and the output of detector 14. Where capacitance rather than ion-mediated conductivity is the dominant mechanism changing the response of sensor 100, both sides of sensor 100 are preferably covered by layers 106 having both strong wicking properties and lower bulk dielectric constants than the liquid of interest. By maintaining physical separation between the individual turns of coil 104 and a surrounding materials of higher bulk dielectric constant, such layers 106 minimize interaction between coil 104 and the surrounding materials, and therefore optimize the change in the properties of coil 104 when higher-dielectric-constant liquid enters layers 106 and interacts with coil 104.

As noted above, detector 14 includes a circuit 18 that provides an output signal indicative of the presence (or absence) of the liquid from the vicinity of a sensor such as sensors 60 and 100. A suitable circuit for use in detector 14 is shown in FIG. 5. A monitoring and detecting circuit 120 includes capacitors 122a and 122b, transistor 124, and resistors 126, 128, 130, which, together with coil 20, form a Colpitts oscillator 132. Oscillator 132 has a resonant frequency given by:

$$f = (1/2\pi)((1/LC) - (R^2/2L^2))^{1/2},$$

where L is the effective inductance of coil 20, and R is the sum of all resistive components around the loop formed by coil 20 and capacitors 122a, 122b. C is the combined series capacitance of capacitors 122a and 122b:

$$C = 1/((1/C_1) + (1/C_2)),$$

where $C_1$ and $C_2$ are the capacitances of capacitors 122a and 122b, respectively. For best operation, $C_1$ should be roughly twice $C_2$. As L decreases and f increases, the amplitude of oscillation decreases.

Capacitors 134 and 136, diodes 138 and 140, a resistor 142, a potentiometer 144 and a voltage comparator 146 form a detector 148 which is sensitive to the oscillation frequency and amplitude. Light-emitting diodes 150 and 152, and resistors 156 and 158 form an output indicator 160. Circuit 120 also preferably includes an activating switch 162, a battery 164 and a bypass capacitor 166.

Figure 6:
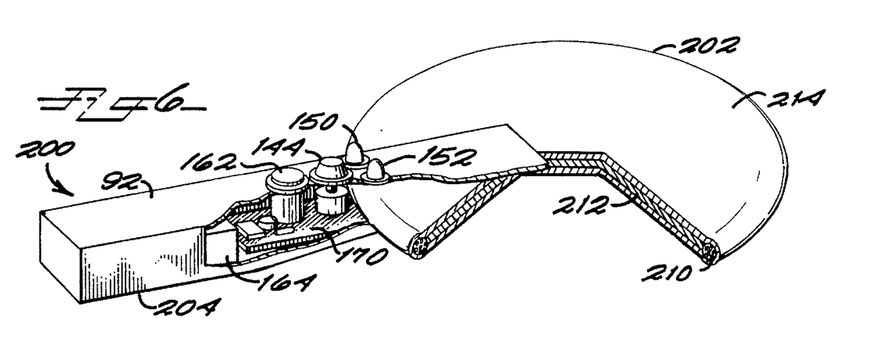
FIG. 6 shows a perspective view of a detector assembly according to a preferred embodiment of the invention.

For use with a liquid sensor such as sensor 60 or 100, circuit 120 is fabricated on a circuit board 170 and contained in an electrically nonconductive housing. For ease of use, circuit 120 may be contained in a handle to which coil 20 is attached, as shown in FIG. 6. A detector 200 includes a coil assembly 202 of like construction to sensor 60 as described above but without electrode array 66. Circuit 120, fabricated on circuit board 170, is contained in a housing 204 attached to coil assembly 202. Housing 204 may form a handle adapted to be grasped by the operator when using detector assembly 200, generally as shown in FIG. 6. Here, coil assembly 202 is set at a slight angle to housing 204, facilitating placement of coil assembly 202 close to and parallel to sensor 60 (or some other suitable liquid sensor).

Coil assembly 202 may be identical with above-described sensor 60 and be packaged in the same way, for example, including a coil 210, a disk 212, and a housing 214 to protect the coil from mechanical damage. All metallic parts of detector 200 except those directly making up coil 210 are located outside the radius of coil 210, so as to interact minimally with the magnetic field of coil 210. This is particularly important in the case of battery 162, because most commercial batteries are steel-jacketed and thus would interact strongly with the field if placed within it. Hence, battery 162 is preferably placed as far as possible from coil 210, for example, at the opposite end of housing 204 from the coil. Coil 210 preferably has the same form and approximate dimensions as coil 62 of sensor 60, and may have a similar or different number of turns. Coils 62 and 210 may, for example, consist of 15 turns of enameled magnet wire forming a flat, circular toroidal ring with an outside diameter of 2.75" (about 7 cm) and an inductance of about 140 μH.

Coil 210 and capacitors 122a, 122b of circuit 120 form a resonant tank circuit which is driven into continuous oscillation by transistor 124. Resistors 126 and 128 provide bias, and an output signal appears across resistor 130. Capacitor 166 serves as a reservoir of charge to help overcome any resistive or inductive effects in switch 162 or battery 164. Capacitor 134 and diodes 138, 140 form a charge pump, with capacitor 136 smoothing the resulting DC voltage and resistor 142 providing a discharge path to ground. The DC voltage across capacitor 136 approximates the peak-to-peak voltage across resistor 130, and thus decreases as the oscillation frequency of oscillator 132 increases.

Potentiometer 144 is used to adjust the response threshold of circuit 120. Potentiometer 144 is preferably set to a voltage midway between those on capacitor 136 when coil 210 interacts with a dry sensor 60 or 100 (or when coil 210 is isolated), and when it interacts with one that is sensing a liquid. However, higher or lower threshold voltages may be used if desired. Comparator 146 produces either a high or a low output voltage, depending on which of these conditions is true. As a result, when switch 160 is closed, either one or the other of LEDs 150, 152 glows: LED 150 in the former case, and LED 152 in the latter. LEDs 150 and 152 are preferably of different colors, for example, red and green, respectively. Potentiometer 144 may be made accessible to the user as shown in FIG. 6, may be adjusted to a desired setting and then sealed inside housing 204, or may be replaced with a pair of fixed resistors forming a voltage divider.

The components of circuit 120 are chosen so as to provide a suitable output signal that varies depending on whether switch 66 is dry (open) or wet (closed). By way of example, the components of circuit 120 may be as follows:

| | |
|---|---|
| 122a | 1360 pf (silver-mica) |
| 122b | 680 pf (silver-mica) |
| 124 | 2N2222 or other general-purpose NPN transistor |
| 126 | 10,000 Ω |
| 128 | 6,800 Ω |
| 130, 156, 158 | 1,200 Ω |
| 134 | 2200 pf (silver-mica) |
| 136 | 0.1 μf (ceramic) |
| 138, 140 | 1N914 or other, general-purpose signal diodes |
| 142 | 1 MΩ |
| 144 | 10,000 Ω; Spectrol type 63 or similar miniature trimmer |
| 146 | LF353 or similar, low power operational amplifier |
| 150 | visible green LED |
| 152 | visible red LED |
| 162 | normally-open, miniature pushbutton, rocker or slide switch |
| 164 | standard 9-volt battery and clip |
| 166 | 1.0 μf (ceramic) |

Using these values, the resonant frequency of coil 210 (with no metal present near the coil) is about 650 kHz. Of course, other values that produce a usable output signal may be used without departing from the spirit of the invention.

In use, a suitable liquid sensor is placed in the region where the presence of a liquid is to be detected, such as engaging the inner wall of a double-walled containment vessel, near process piping, and so forth. Depending on the application, sensor 60 (FIG. 3) or sensor 100 (FIG. 4) may be used, with coils and 104, respectively, serving as coil 16 of apparatus 12. Detector 200 is activated by pressing switch 162, and potentiometer 144 is adjusted so that green LED 150 glows. Passing coil assembly 202 over a dry sensor 60 does not change the resonant frequency of oscillator circuit 132, so there is no change in the output of circuit 120. However, if sensor 60 is wet, the resulting current induced in coil 62 and the change in the inductance of coil 210 raises the resonant frequency of oscillator 132, lowers the amplitude of the voltage across resistor 130 and causes red LED 152 to glow instead, alerting the operator to the presence of moisture.

Sensors 60 and 100, and detectors 200, may be used in a variety of arrangements to monitor a structure for the presence of a liquid. For example, a plurality of sensors 60 (or sensors 100) may be attached to the outer surface of the primary containment of a vessel, pipeline or the like. A plurality of detectors 200 may be mounted outside the secondary containment, with a detector assembly aligned with each sensor. Alternatively, a separate detector coil 202 might be associated with each sensor 60, with all coils 202 connected to a single monitoring circuit 120. Circuit 120 could be provided with means for switching among the plurality of individual coils 202, and, preferably, means for indicating which coil 202 senses a liquid at its associated sensor. If desired, an operator might use a single detector 200 to check a series of sensor locations in turn, in different locations of the same containment vessel or in different vessels. Detector 200 is preferably used adjacent to, but outside the immediate environment of sensor 60. Thus, detector 200 would not be subject to corrosion or contamination and could readily be re-used.

When used to detect the presence of physiological fluids, such as in a surgical dressing or a diaper, a suitably-sized sensor 60 (or a sensor 100, preferably coated on both sides with layers 106) is placed in a position where it is likely to be wetted by contact with the fluid in question. For example, sensor 60 is placed inside a diaper, preferably with a layer of material interposed between the sensor and the skin, and with switch 66 facing away from the wearer's body. (If desired, the diaper may be fashioned with a pocket for placing the sensor.) Holding handle 204 of detector 200 and activating switch 162, the operator moves detector 200 over the site, which may, of course be covered by clothing. If sensor 60 is dry, there is no change or red LED 152 is dimly lit, leaving green LED 150 brightly lit. If detector 200 senses moisture, green LED 150 will go out and red LED 152 will burn brightly instead, indicating that the diaper needs to be changed.

In an alternative preferred embodiment of the present invention, sensor 12 and detector 14 are physically attached to one another to form a probe, with sensor 12 adapted for insertion into the region wherein the presence of a liquid is to be detected. Such a probe could be made approximately flat, so as to enter the region easily, with rounded edges so as not to cause injury when used on humans.

Figure 7:
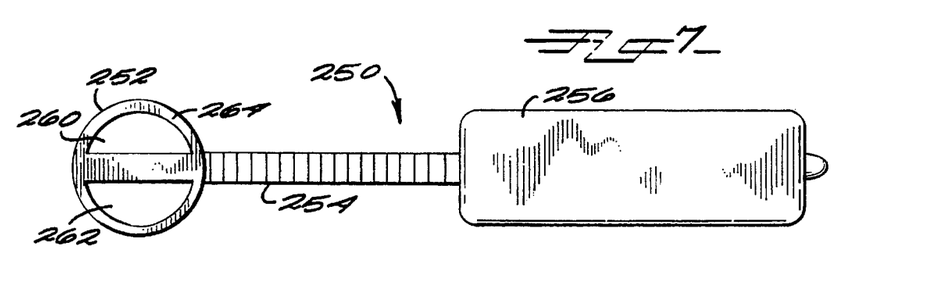
FIG. 7 shows an apparatus according to an alternative preferred embodiment of the invention.

Such a probe 250 is shown in FIG. 7. Probe 250 includes a liquid sensor 12 in the form of a probe head 252, a flexible connecting rod 254 and a detector circuit contained in a housing 256.

Probe head 252 preferably takes the form of a disk made from a tough, electrically nonconducting and nontoxic material such as epoxy or polycarbonate plastic. Two substantially flat electrodes 260, 262 are set into a surface 264 of head 252, with their surfaces set flush with surface 264. Electrodes 260, 262 may be geometrically simple shapes as shown, or may be interdigitated in the manner of previously-described electrodes 34, 36. Electrodes 260, 262 are preferably made from a nontoxic and corrosion-resistant metal such as stainless steel. Electrodes 260, 262 are both located on the same flat or slightly convex surface 264 of head 252; the opposing surface (not shown) of head 252 is nonconducting. If desired, probe head 252 may include a moisture-responsive switch such as those shown in FIGS. 2a–d instead of electrodes 260, 262.

Figure 8:
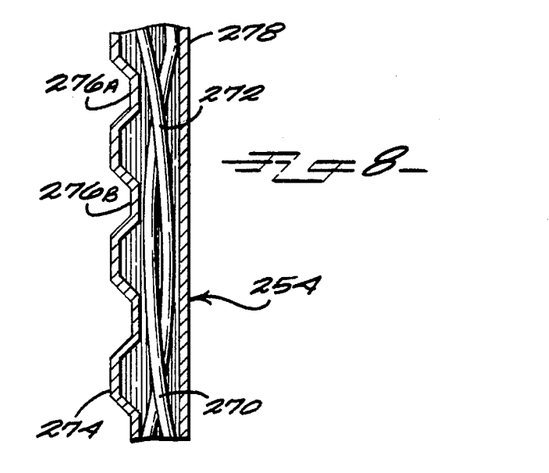
FIG. 8 is a cross-sectional view of the flexible rod of the apparatus of FIG. 7.

Electrically conducting wires 270, 272 extend through rod 254 to connect electrodes 260, 262, respectively, to a detecting circuit contained in housing 256. Rod 254 is hollow, and may have wires or rods (not shown) of some stiff but bendable metal at the sides, so that rod 254 accepts and retains a bend made by hand. In a preferred embodiment, rod 254 has a flattened surface 274 with grooves or creases 276a, 276b, and so forth formed therein (FIG. 8). Opposing surface 278 is substantially flat. Grooves 276 facilitate longitudinal bending of rod 254 with surface 274 and housing 256 facing the center of curvature, but not transverse bending or bending to the sides of rod 254. As shown in FIG. 7, surface 274 preferably faces in the same direction as surface 264 of probe head 252. If desired, however, rod 254 may be bendable in other directions.

Figure 9:
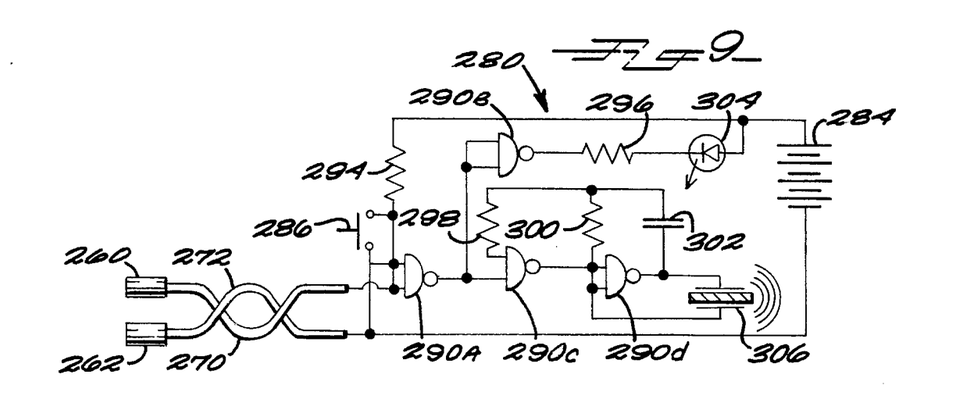
FIG. 9 is a detecting and monitoring circuit for use with the apparatus of FIG. 7.

Housing 256 may contain oscillating circuitry akin to circuit 120, but, since coupling is now direct, the same functions may be achieved more simply by using direct current, for instance by a circuit 280 powered by a battery 284. Circuit 280 is capable of detecting an electrical leakage path between electrodes 260, 262 and of giving a visible or audible indication (or both) through an output device, while permitting only a very small current to flow over such a path, and while itself drawing virtually no current from battery 284.

Housing 256 may be sealed, with battery 284 a long-lived, nonreplaceable type such as a lithium battery, or, alternatively, housing 256 may have a removable panel through which battery 284 may be removed and replaced. Housing 256 may also be provided with a small test pushbutton or switch 286 which simulates a leakage path between electrodes 260, 262.

In a preferred embodiment, circuit 280 includes a CD4011-type silicon chip 288 having four two-input NAND gates 290a, 290b, 290c, 290d, or some other, equivalent type of CMOS chip. Chip 288 is preferably used in die form, bonded to a substrate which also holds four chip resistors 294, 296, 298, 300 and a monolithic chip capacitor 302. Gates 290a, 290b, 290d are connected as simple inverters. Chip 288 has a response threshold that is inherently approximately one-half the voltage provided by battery 284. Alternatively, another type of chip, providing at least one two-input NAND gate and three inverters, could be used. If desired, gate 290a could be replaced with a voltage comparator (similar in function to potentiometer 144 of circuit 120), such as an LM-339 type comparator, with the reference voltage set at about one-half the voltage provided by battery 284. Of course, lower or higher reference voltages may be used if desired.

Current is supplied through resistor 294 to electrode 260, switch 286 and the inputs of gate 290a. Normally, these inputs are held at a logic "high," and the output of gate 290a is therefore at logic "low." Upon closure of switch 286, or upon the establishment of an electrical leakage path between electrodes 260 and 262, the current flows to ground and the voltage input to gate 290a drops below one-half the voltage of battery 284. The output of gate 290a accordingly swings "high," signaling an alarm condition.

Gate 290b inverts the output signal from gate 290a, so in an alarm condition the output of gate 290b is "low." Current then flows through resistor 296 and LED 304 (preferably red), gives a visible indication of the alarm. At all other times, the output of gate 290b is "high" and no current flows in this path.

Gates 290c and 290d, resistors 298 and 300, and capacitor 302 form an astable multivibrator which oscillates when the output of gate 290a is "high" but is quiescent at all other times, drawing no supply current. The outputs from gates 290c and 290d are equal but opposite in phase, and are used to drive a piezoelectric element 306 to produce an audible signal.

Preferred values for the components of circuit 280 are such as produce a physiologically-undetectable leakage current between electrodes 260, 262, preferably a current on the order of 10 microamperes or less. Suitable values to produce an audible frequency of about 1,700 Hz are as follows:

| | |
|---|---|
| 284 | replaceable 9-volt battery; miniature lithium, mercury or other cells connected in series to supply 6–10 volts at a maximum expected current of 20–30 milliamperes |
| 294, 298 | 1 MΩ |
| 296 | 560 Ω |
| 300 | 12,000 Ω |
| 302 | 0.022 μf |

In use, probe head 252 is placed in the region where the presence of a liquid is to be detected, with housing 256 outside the region. For example, head 252 may be placed against the outer surface of a pipeline or vessel, or inserted into soil to determine whether watering is needed. When used to detect the state of a diaper (i.e., wet or dry), head 252 is inserted between the diaper and the body of the wearer. Electrodes 260, 262 are in contact with the diaper material and preferably face away from the body. Rod 254 may be bent as desired to facilitate placement of head 252; grooves 276 help to ensure that electrodes 260, 262 are properly positioned. In the absence of moisture, no alarm is given. If moisture is present, the probe will respond both with a visible glow and an audible tone. If desired, circuit 280 may be provided with a cut-off switch to allow the operator to shut off the alarm. Probe head 252 may be permanently connected with housing 256, or, alternatively, may be made removable so that it can be cleaned and dried for re-use, or replaced if damaged.

It will be apparent to those skilled in the art that many changes and substitutions can be made to the preferred embodiment herein described without departing from the spirit and scope of the present invention as defined by the appended claims.

What is claimed is:

1. An apparatus for detecting the presence of a liquid in a region, said apparatus comprising:

a first electrically conducting circuit;

a second electrically conducting circuit spaced apart from said first circuit and having a first terminal and an opposing, spaced-apart second terminal;

a switch for connecting said first and second terminals of said second circuit, said switch completing said second circuit when exposed to said liquid;

means electrically connected to said first circuit for generating a first alternating current having a first resonant frequency in said first circuit, said first alternating current inducing a second alternating current in said second circuit when said second circuit is placed in said region, said first circuit is brought close to said second circuit and said switch is closed, said second alternating current causing a change in said first resonant frequency of said first circuit to a second resonant frequency; and means for indicating closure of said switch by exposure to said liquid, said indicating means indicating said change from said first resonant frequency to said second resonant frequency.

2. The apparatus as recited in claim 1, wherein said generating means further comprises an oscillator circuit for generating said first alternating current.

3. The apparatus as recited in claim 1, wherein said switch comprises means positioned between said first and said second terminals for absorbing said liquid, said absorbing means expanding upon absorption of said liquid and pushing said first and second terminals into contact, thereby closing said second circuit.

4. The apparatus as recited in claim 1, wherein said switch comprises an absorbent material positioned between said first and said second terminals, said absorbent material being substantially electrically nonconducting when said material has not absorbed said liquid and substantially electrically conducting when said material absorbs said liquid, said material conducting said second alternating current between said first and said second terminals, thereby closing said second circuit, when said material has-absorbed said liquid and not conducting between said first and said second terminals when said material has not absorbed said liquid.

5. The apparatus as recited in claim 1, wherein said first terminal and said second terminal are in the form of a plurality of conductors interleaved with but spaced apart from each other, separated by said switch, said switch comprising a material that is substantially nonconducting when not exposed to said liquid and that is substantially conducting when exposed to said liquid, said material conducting said second alternating current between said first and said second terminals when said material is exposed to said liquid, thereby closing said second circuit.

6. The apparatus as recited in claim 1, wherein said indicating means further comprises a transducer in operative connection with said second circuit, said transducer producing a first signal in response to said first frequency and a second signal in response to said second frequency.

7. The apparatus as recited in claim 1, wherein said indicating means further comprises a transducer in operative connection with said second circuit, said transducer producing an audible signal in response to said second frequency.

8. An apparatus for detecting the presence of a liquid in a region, said apparatus comprising:

a first electrically conducting coil;

a second electrically conducting coil spaced apart from said first coil and having a first terminal and an opposing, spaced apart second terminal;

a switch for connecting said first and second terminals of said second coil, said switch completing said second coil when closed by exposure to said liquid;

means electrically connected to said first coil for generating a first alternating current having a first resonant frequency in said first coil, said first alternating current inducing a second alternating current in said second coil when said second coil is placed in said region, said first coil is brought proximate to said second coil and said switch is closed by said liquid, said induction of said second alternating current causing a change in said first resonant frequency of said first coil to a second resonant frequency; and a transducer responsive to said change from said first resonant frequency to said second resonant frequency to indicate closure of said switch by the presence of said liquid.

9. The apparatus as recited in claim 8, wherein said transducer gives an audible signal to indicate closure of said switch.

10. The apparatus as recited in claim 8, wherein said transducer gives a visual signal to indicate closure of said switch.

11. The apparatus as recited in claim 8, wherein said generating means comprises an oscillator circuit for generating said first alternating current.

12. The apparatus as recited in claim 8, wherein said switch comprises means positioned between said first and said second terminals for absorbing said liquid, said absorbing means expanding upon absorption of said liquid and pushing said first and second terminals into contact, thereby closing said second coil.

13. The apparatus as recited in claim 8, wherein said switch comprises an absorbent material positioned between said first and said second terminals, said absorbent material being substantially electrically nonconducting when said material has not absorbed said liquid and substantially electrically conducting when said material absorbs said liquid, said material conducting said second alternating current between said first and said second terminals, thereby closing said second coil, when said material has absorbed said liquid and not conducting between said first and said second terminals when said material has not absorbed said liquid.

14. The apparatus as recited in claim 8, wherein said first terminal and said second terminal are in the form of a plurality of conductors interleaved with but spaced apart from each other, separated by said switch which further comprises a material that is substantially nonconducting when not exposed to said liquid and that is substantially conducting when exposed to said liquid, said material conducting said second alternating current between said first and said second terminals when said material is exposed to said liquid, thereby closing said second circuit.

15. The apparatus as recited in claim 8, wherein said first and second coils are made of a material selected from the group consisting essentially of aluminum, copper, gold, palladium, platinum, silver, stainless steel, and alloys thereof.

16. The apparatus as recited in claim 8, wherein each of said first and second coils has between approximately 5 and 100 turns.

17. The apparatus as recited in claim 8, further comprising a substantially nonreactive, water-impermeable housing having an outer surface, said first coil contained within said housing, said switch attached to said outer surface of said housing and in electrical communication with said first coil.

18. The apparatus as recited in claim 8, wherein said first terminal and said second terminal are in the form of a plurality of conducting fingers interleaved with but spaced apart from each other.

\* \* \* \* \*